NORMAL AND ASSOCIATIVE READ OUT CIRCUIT
FOR LOGIC MEMORY ELEMENTS
Filed July 15, 1965

INVENTORS
Donald E. Murray
Walter C. Seelbach
BY
Mueller, Aichele & Rauner
ATT'YS.

United States Patent Office
3,422,283
Patented Jan. 14, 1969

3,422,283

NORMAL AND ASSOCIATIVE READ OUT CIRCUIT FOR LOGIC MEMORY ELEMENTS

Donald E. Murray and Walter C. Seelbach, Scottsdale, Ariz., assignors to Motorola, Inc., Franklin Park, Ill., a corporation of Illinois Filed July 15, 1965, Ser. No. 472,177
U.S. Cl. 307—207 8 Claims
Int. Cl. H03k 19/08

Figure 1:
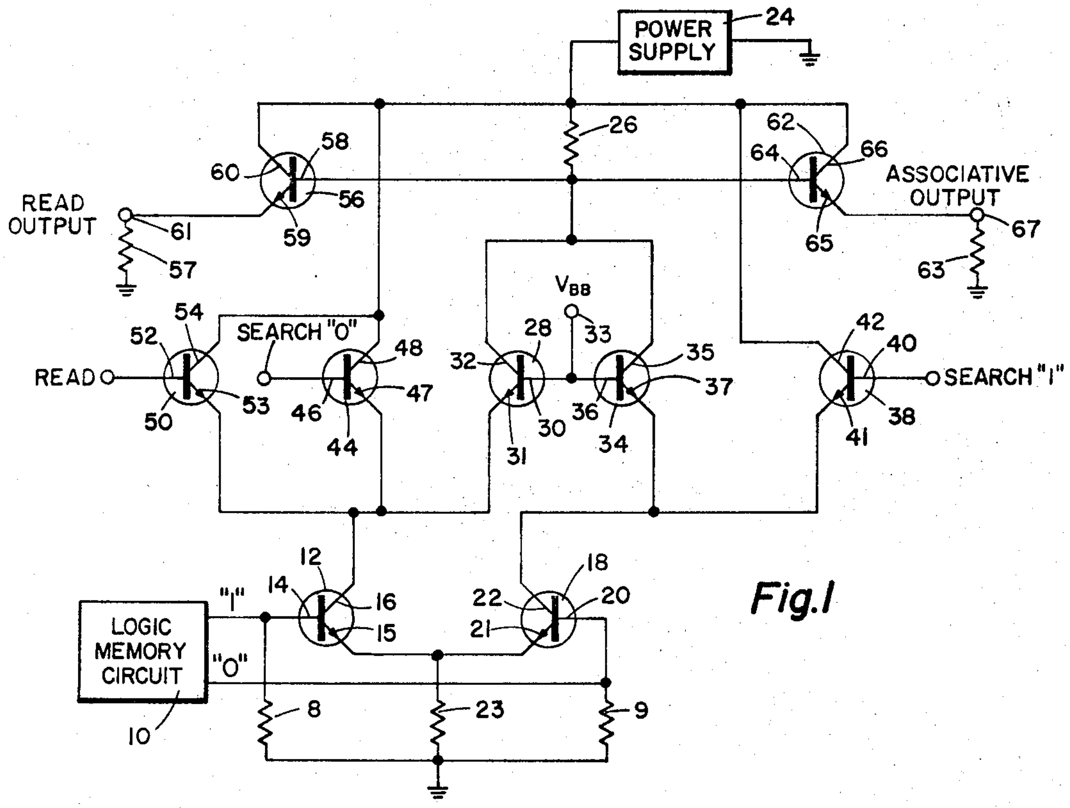

This invention relates to logic gate circuits and in particular to an output gating circuit for accomplishing a "normal" read out or an "associative" read out of a memory circuit.

Logic circuit elements, employing semiconductor devices, have been developed in which the logic functions are performed by switching currents between alternative paths. One form of these logic elements acts as a memory element to store data and it is necessary that circuitry be provided to read out the information stored in the memory elements. Two types of read out are required, a "normal" read out and an "associative" read out. With "normal" read out data stored in the memory is read out upon the application of a "read" signal. For an example, if a "1" is stored in the memory, the application of the "read" signal should develop a "1" at the output of the read out circuit. With "associative" read out an output is developed from a memory if the data stored in the memory is a mismatch with the "associative" read out signal and no output is obtained if the data stored in the memory matches the read out signal. For example, if a "1" is stored in the memory the application of a "search '0' " signal would produce a "1" output at the "associative" read out terminal while the application of a "search '1' " signal would produce a "0" output at the "associative" read out terminal.

Prior art devices capable of operating at high speed have required that more than one unit of current be switched in order to perform the above functions. The requirement that more than one unit of current be switched in each of the read out gates will cause a large increase in power consumption of devices such as computers in which large numbers of the read out circuits are incorporated. Some prior art circuits have operated the semiconductor devices in a saturated condition thus slowing the operation of the circuitry. In addition, it is desirable that the components used in the circuits be limited to transistors, diodes and resistors so that the circuit may be easily fabricated in an integrated circuit form.

It is, therefore, an object of this invention to provide an improved read out circuit for a logic memory element.

Another object of this invention is to provide a read out circuit for a logic memory element capable of performing both "normal" read out and "associative" read out.

Another object of this invention is to provide a read out circiut for a logic memory element which requires only one unit of current for operation and in which the semiconductor devices used in the circuit operate in an unsaturated condition.

Another object of this invention is to provide a read out circuit having only transistors, diodes and resistors so that the circuit is readily adaptable to construction as an integrated circuit.

A feature of this invention is a provision of a read out circuit for a logic memory element in which the data stored within the memory element controls the flow of current through different paths with each of the paths including the same output resistor to develop an output signal.

Another feature of this invention is the provision of a read out circiut for a logic memory element having bypass switching means operative to bypass said output resistor to change said output signal.

Figure 2:
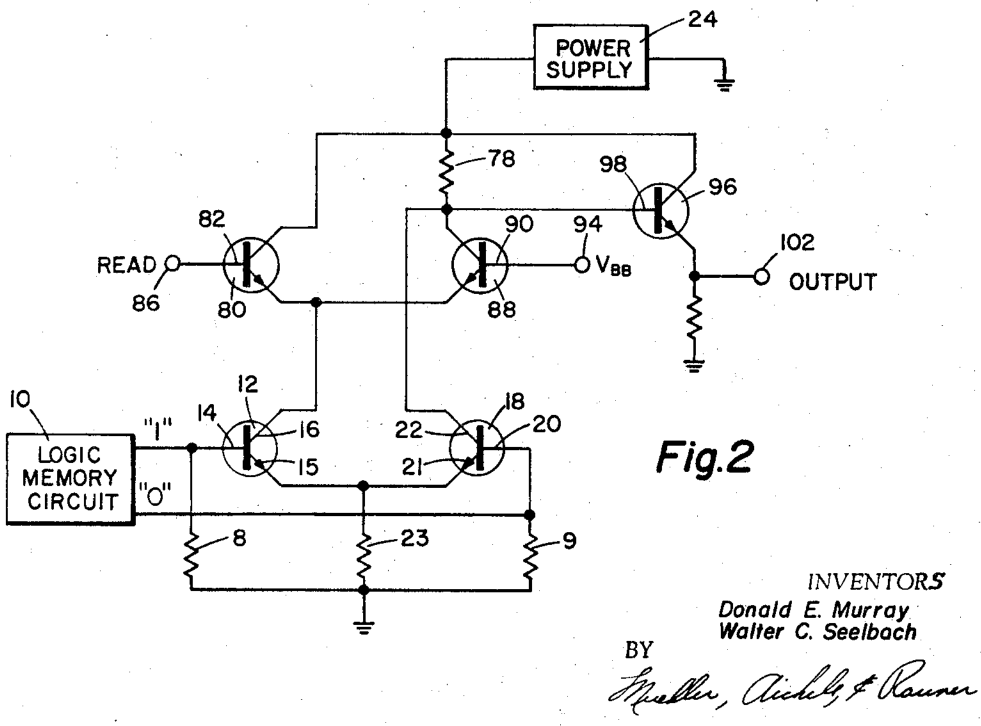

The invention is illustrated in the drawings in which:

FIG. 1 is a partial block diagram and partial schematic diagram showing the read out circuit of the invention; and FIG. 2 is a partial schematic and partial block diagram of a modified form of the circuit of FIG. 1.

In practicing this invention, a memory element is provided having a binary number stored therein. The number stored in the memory element operates to bias switching transistors to control the flow of current through one of two paths with each path including the same output resistor across which an output signal is developed. Bypass switching transistors are coupled in each current path to provide a separate path for bypassing the output resistor to change the output signal. Separate bypass transistors are provided for "associative" read out and a "normal" read out. A modified embodiment of this circuit permits the "normal" read out function only to be accomplished with a minimum number of components.

FIG. 1 is a partial block diagram and a partial schematic diagram of a circuit incorporating the features of this invention. A logic memory element 10 is provided which is capable of storing a "0" or "1." The "0" output of logic memory element 10 is coupled to base 20 of transistor 18 and the "1" output of logic memory element 10 is coupled to base 14 of transistor 12. If a "0" is stored in logic memory element 10, transistor 18 is biased to conduction and if a "1" is stored in logic memory element 10 transistor 12 is biased to conduction. Resistors 8 and 9 are load resistances for the output of logic memory element 10. Resistor 23 couples emitters 15 and 21 of transistors 12 and 18 to a first reference potential.

By using each of the logic outputs of logic memory element 10 to control transistors 12 and 18 instead of coupling the base of one of the transistors to a reference potential, an improved noise immunity can be obtained for the same logic swing or the logic swing can be reduced without a reduction in the noise immunity. Reducing the logic swing reduces the RC time constant of the memory element circuit, thus increasing the speed of operation of the memory element circuit. The reduction in logic swing also reduces the tendency of the logic memory element circuit to saturate with changes in power supply voltage and ambient temperature.

A power supply 24 is coupled to the first reference potential and to collectors 32 and 35 of transistors 28 and 34 by output resistor 26. Emitters 31 and 37 of transistors 28 and 34 are coupled to collectors 16 and 22 of transistors 12 and 18. A second reference voltage $V_{BB}$ is coupled from terminal 33 to bases 30 and 36 of transistors 28 and 34 to provide a bias potential for these transistors.

Emitter 41 of transistor 38 is coupled to emitter 37 of transistor 34 and collector 42 of transistor 38 is coupled to power supply 24. Transistor 38 is adapted to receive a "search '1' " signal on its base 40. Emitters 47 and 53 of transistors 44 and 50 are coupled to emitter 31 of transistor 28 and collectors 48 and 54 of transistors 44 and 50 are coupled to power supply 24. Transistor 44 is adapted to receive a "search '0' " signal on its base 46 and transistor 50 is adapted to receive a "read" signal on its base 52. "Read" output transistor 56 has its emitter 59 coupled to "read" output terminal 61 and load resistor 57, and its collector 60 coupled to power supply 24. A bias signal is supplied to base 58 of transistor 56 from output resistor 26. "Associative" output transistor 62 has its emitter 65 coupled to the "associative" output terminal 67 and load resistor 63, and its collector 66 coupled to power supply 24. A bias signal is supplied to base 64 of transistor 62 from resistor 26. Since a load resistor only appears in the collector circuit of transistors having their bases connected to the reference voltage $V_{BB}$ some saturation margin is gained over circuits in which a load resistor is connected to the collector circuit of transistors having their bases tied to logic level inputs.

In describing the operation of the circuit of FIG. 1, assume that a "0" is stored in logic memory element 10. The "0" signal applied to base 20 of transistor 18 will bias transistor 18 to conduction. In normal operation when there is no "associative search" or "read" signal applied to the circuit the reference voltage $V_{BB}$ applied to terminal 33 biases either transistor 28 or 34 to conduction depending upon whether transistor 12 or 18 respectively is biased to conduction. Thus, with a "0" stored in logic memory element 10 current will flow from power supply 24 through output resistor 26, transistor 34, transistor 18 and resistor 23 to the first reference potential. The magnitude of this current is substantially constant and is determined by the level of the "0" signal applied to base 20 of transistor 18 and resistor 23.

Current will not flow through transistor 28 since transistor 12 is biased to non-conduction, thus forcing transistor 28 to be biased to non-conduction. If a "1" is stored in logic memory element 10, transistor 12 will be biased to conduction and transistor 18 will be biased to non-conduction. Current will then flow through output resistor 26, transistors 28 and 12 and resistor 23. In each case a single unit of current flows through output resistor 26 and the magnitude of this current is substantially constant. The flow of current through output resistor 26 reduces the bias potential applied to the bases 58 and 64 of transistors 56 and 62 biasing each of the transistors to a minimum conduction condition. Thus, the output potential on both "read" terminal 61 and "associative" output terminal 67 is low.

If it is desired to conduct an "associative search," to determine if a "1" is stored in logic memory element 10 a "search '1' " signal is applied to base 40 of transistor 38. The result of the search should be a high output from the "associative" output terminal 67 if there is a mismatch or a "0" stored in logic memory element 10 and a low output from the "associative" output terminal 67 if there is a match or a "1" stored in logic memory element 10.

When a "0" is stored in memory element 10 and a search signal is applied to the "search '1' " terminal, base 40 of transistor 38, transistor 38 is biased to conduction and transistor 34 is biased to non-conduction since emitters 37 and 41 of transistors 34 and 38 are coupled together. Thus, current now flows from power supply 24 through transistor 38, transistor 18 and resistor 23. While the magnitude of the current through the circuit is unchanged the magnitude of the current through resistor 26 is reduced to zero and the potential applied to base 64 is high. This high potential applied to base 64 biases transistor 62 to a maximum conduction state and produces a high output signal at "associative" output 67. If a "1" were stored in logic memory element 10 a "search" signal applied to the search "0" terminal would produce high output signal at "associative" output 67.

If a search were to be conducted for a "0" a "search '0' " signal would be applied to base 46 of transistor 44 which would attempt to bias transistor 44 to conduction. However, since a "0" is stored in logic memory element 10, transistor 12 is biased to non-conduction thus requiring transistor 44 to be biased to non-conduction. Current will continue to flow through output resistor 26, transistor 34 and transistor 18 and the output potential applied to base 64 of transistor 62 would remain low because of the voltage drop across resistor 26. Thus, with a "0" stored in logic memory element 10 a search for a "0" would produce a low output from "associative" output terminal 67. If a "1" were stored in logic memory element 10 a search signal applied to the "search '1' " terminal would produce a low output from the "associative" output terminal 67.

If it is desired to read out the information stored in logic memory element 10 a signal is applied to the "read" terminal, base 52 of transistor 50. If a "0" is stored in logic memory element 10 transistor 18 is conducting and transistor 12 is non-conducting. Current will flow through output resistor 26, transistor 34, transistor 18 and resistor 23. Attempting to bias transistor 50 to conduction by applying a read signal to base 52 of transistor 50 does not change the flow of current through output resistor 26, since transistor 50 can be biased to conduction only if transistor 12 is biased to conduction. Thus, the output bias applied to base 58 of transistor 56 is low and the potential at the "read" output terminal 61 is low. If a "1" is stored in logic memory element 10 transistor 12 is biased to conduction and the current flow is from power supply 24 through output resistor 26, transistors 28 and 12 and resistor 23. Biasing transistor 50 to conduction cuts off the flow of current through output resistor 26. When no current flows through output resistor 26, the potential applied to base 58 of transistor 56 is high and the potential at the "read"output terminal 61 is high.

A partial block diagram and partial schematic of a circuit modified to incorporate only the "read out" feature is shown in FIG. 2. In FIG. 2, components identical to those of FIG. 1 have the same reference numeral. Base 90 of transistor 88 is coupled to a reference potential $V_{BB}$ applied to terminal 94. When there is no "read" signal applied to "read" terminal 86 the potential applied to base 82 of transistor 80 is low. When a "1" is stored in logic memory element 10, transistor 80 is biased to non-conduction and transistor 88 is biased to conduction. Under these conditions current flows from power supply 24 through output resistor 78, transistor 88, transistor 12 and resistor 23. If a "0" is stored in logic memory element 10 the flow of current is from power supply 24 through output resistor 78, transistor 18 and resistor 23. In each case, the voltage drop across resistor 78 produces a low output potential on base 98 of transistor 96 and thus a low output potential on "read"output terminal 102.

With "0" stored in logic memory element 10, a "read" pulse applied to terminal 86 will attempt to bias transistor 80 to conduction. However, since transistor 12 is biased to non-conduction current will not flow through transistor 80 and current will continue to flow through output resistor 78. Thus, the potential applied to base 98 of transistor 96 continues to be low and the output potential of "read" output terminal 102 is low. If a "1" is stored in logic memory element 10, transistor 12 is biased to conduction and current flows from power supply 24 through resistor 78, transistors 88 and 12 and resistor 23. A "read" signal applied to terminal 86 biases transistor 80 to conduction causing the current to bypass output resistor 78 and flow through transistors 80 and 12 and resistor 23. When the flow of current through output resistor 78 ceases, the potential on base 98 of transistor 96 rises causing the potential on the "read" output terminal 102 to rise indicating that a "1" is stored in logic memory element 10.

Thus, a simple circuit has been described which provides for reading out the information stored in a logic memory element. The circuit is capable of both "associative" read out the "normal" read out. The semiconductor devices used operate in an unsaturated condition permitting high speed operation and no more than one unit of current flows in the read out circuit. Only transistors and resistors are used in the circuit so that it is readily adaptable to integrated circuit construction.

We claim:

1. A read out gate circuit for use with a memory circuit adapted to store first and second data signals one at a time, said read out gate circuit including in combination, power supply means for providing a current, first and second current paths coupled to said power supply means, impedance means common to each of said first and second current paths, said first and second current paths further including first and second data switching means respectively coupled to the memory element, a given one of said first and second data switching means being responsive to the particular one of the first and second data signals stored in the memory circuit to become conductive whereby said current flows through the current path including said given data switching means and through said impedance means, bypass switching means coupled to at least one of said current paths and adapted to receive a read signal, said bypass switching means being responsive to said read signal to become conductive whereby a third current path bypassing said impedance means is provided, output means coupled to said impedance means and responsive to the magnitude of said flow of current through said impedance means to develop first and second output signals.

2. A read out gate circuit for use with a memory circuit adapted to store first and second data signals one at a time, said read out gate circuit including in combination, power supply means for providing a current coupled to a reference potential, impedance means coupled to said power supply means, first and second current paths each coupled to said impedance means and said reference potential, said first current path having first data switching means coupled to the memory circuit for receiving the first data signal and being responsive thereto to become conductive, said second current path having second data switching means coupled to the memory circuit for receiving the second data signal and being responsive thereto to become conductive, at least one of said first and second current paths having normally conductive current switching means coupled in series with said data switching means included in said one current path, a given one of said first and second data switching means being responsive to the particular one of the first and second data signals stored in the memory circuit to become conductive whereby said current flows through the current path including said given data switching means and through said impedance means, bypass switching means coupled to said current switching means and to said power supply means, said bypass switching means being adapted to receive a read signal and being responsive thereto to become conductive and to render said current switching means coupled thereto non-conductive whereby a third current path bypassing said impedance means is provided, output means coupled to said impedance means and responsive to the magnitude of said flow of current through said impedance means to develop first and second output signals.

3. A read out gate circuit for use with a memory circuit adapted to store first and second data signals one at a time, said read out gate circuit including in combination, power supply means for providing a current coupled to a reference potential, impedance means coupled to said power supply means, first and second current paths each coupled to said impedance means and said reference potential, said first current path having first data switching means coupled to the memory circuit for receiving the first data signal and being responsive thereto to become conductive, said second current path having second data switching means coupled to the memory circuit for receiving the second data signal and being responsive thereto to become conductive, said first current path having normally conductive first current switching means coupled in series with said first data switching means and said second current path having normally conductive second current switching means coupled in series with said second data switching means, a given one of said first and second data switching means being responsive to the particular one of the first and second data signals stored in the memory circuit to become conductive whereby said current flows through the current path including said given data switching means and through said impedance means, first and second bypass switching means coupled to said first and second current switching means respectively and to said power supply means, each of said first and second bypass switching means being adapted to receive a read signal and being responsive thereto to become conductive and to render said current switching means coupled thereto non-conductive whereby a third current path bypassing said impedance means is provided, output means coupled to said impedance means and responsive to the magnitude of said flow of current through said impedance means to develop first and second output signals.

4. A read out gate circuit for use with a memory circuit adapted to store first and second data signals one a time, said read out gate circuit including in combination, power supply means for providing a current coupled to a reference potential, impedance means coupled to said power supply means, first and second current paths each coupled to said impedance means and said reference potential, said first current path having first data switching means coupled to the memory circuit for receiving the first data signal and being responsive thereto to become conductive, said second current path having second data switching means coupled to the memory circuit for receiving the second data signal and being responsive thereto to become conductive, said first current path further having normally conductive current switching means coupled in series with said first data switching means, a given one of said first and second data switching means being responsive to the particular one of the first and second data signals stored in the memory circuit to become conductive whereby said current flows through the current path including said given data switching means and through said impedance means, bypass switching means coupled to said current switching means and to said power supply means, said bypass switching means being adapted to receive a read signal and being responsive thereto to become conductive and to render said current switching means coupled thereto non-conductive whereby a third current path bypassing said impedance means is provided, output means coupled to said impedance means and responsive to the magnitude of said flow of current through said impedance means to develop first and second output signals.

5. A read out gate circuit for use with a memory circuit adapted to store first and second data signals one at a time, said read out gate circuit including in combination, power supply means for providing a current coupled to a reference potential, resistance means coupled to said power supply means, first data switching means having a control electrode coupled to the memory circuit for receiving the first data signal and being responsive thereto to become conductive, said first data switching means further having an output electrode coupled to the reference potential and an input electrode, second data switching means having a control electrode coupled to the memory circuit for receiving the second data signal and being responsive thereto to become conductive, said second data switching means further having an output electrode coupled to said reference potential and an input electrode, normally conductive first and second current switching means each having an output electrode coupled to said input electrode of said first and second data switching means respectively and an input electrode coupled to said resistance means, said first data switching means and said first current switching means forming a first current path and said second data switching means and said second current switching means foming a second current path, a given one of said first and second data switching means being responsive to the particular one of the first and second data signals stored in the memory unit to become conductive whereby said current flows through the current path including said given data switching means and through said resistance means, first and second bypass switching means each having an output electrode coupled to said output electrode of said first and second current switching means respectively an input electrode coupled to said power supply means and a control electrode adapted to receive first and second read signals respectively, each of said first and second bypass switching means being responsive to the read signal applied thereto to become conductive and to render said current switching means coupled thereto non-conductive whereby a third current path bypassing said resistance means is provided, output means coupled to said resistance means and responsive to the magnitude of said flow of current though said resistance means to develop first and second output signals.

6. A read out gate circuit for use with a memory circuit adapted to store first and second data signals one at a time, said read out gate circuit including in combination, power supply means for providing a current coupled to a reference potential, resistance means coupled to said power supply means, first data switching means having a control electrode coupled to the memory circuit for receiving the first data signal and being responsive thereto to become conductive, said first data switching means further having an output electrode coupled to the reference potential and an input electrode, second data switching means having a control electrode coupled to the memory circuit for receiving the second data signal and being responsive thereto to become conductive, said second data switching means further having an output electrode coupled to said reference potential and an input electrode coupled to said resistance means, normally conductive current switching means having an output electrode coupled to said input electrode of said first data switching means and an input electrode coupled to said resistance means, said first data switching means and said current switching means forming a first current path and said second data switching means forming a second current path, a given one of said first and second data switching means being responsive to the particular one of the first and second data signals stored in the memory circuit to become conductive whereby said current flows through the current path including said given data switching means and through said resistance means, bypass switching means having an output electrode coupled to said output electrode of said current switching means an input electrode coupled to said power supply means and a control electrode adapted to receive a read signal, said bypass switching means being responsive to said read signal to become conductive and to render said current switching means coupled thereto non-conductive whereby a third current path bypassing said resistance means is provided, output means coupled to said resistance means and responsive to the magnitude of said flow of current through said resistance means to develop first and second output signals.

7. A read out gate circuit for use with a memory circuit adapted to store first and second data signals one at a time, said read out gate circuit including in combination, power supply means for providing a current coupled to a reference potential, resistance means coupled to said power supply means, a first data switching transistor having a base electrode coupled to the memory circuit for receiving the first data signal and being responsive thereto to become conductive, said first data switching transistor further having an emitter electrode coupled to the reference potential and a collector electrode, a second data switching transistor having a base electrode coupled to the memory circuit for receiving the second data signal and being responsive thereto to become conductive, said second data switching transistor further having an emitter electrode coupled to said reference potential and a collector electrode, normally conductive first and second current switching transistors each having an emitter electrode coupled to said collector eectrode of said first and second data switching transistors respectively and a collector electrode coupled to said resistance means, said first data switching transistor and said first current switching transistor forming a first current path and said second data switching transistor and said second current switching transistor forming a second current path, a given one of said first and second data switching transistors being responsive to the particular one of the first and second data signals stored in the memory circuit to become conductive whereby said current flows through the current path including said given data switching transistor and through said resistance means, first and second bypass switching transistors each having an emitter electrode coupled to said emitter electrode of said first current switching transistor a collector electrode coupled to said power supply means and base electrodes adapted to receive first and second read signals respectively, a third bypass switching transistor having an emitter electrode coupled to said emitter electrode of said second current switching transistor, a collector electrode coupled to said power supply means and a base electrode adapted to receive a third read signal, said first, second and third bypass switching transistors being responsive to said first, second and third read signals respectively to become conductive and to render said current switching transistor coupled thereto non-conductive, whereby a third current path bypassing said resistance means is provided, output means coupled to said resistance means and responsive to the magnitude of said flow of current through said resistance means to develop first and second output signals.

8. A read out gate circuit for use with a memory circuit adapted to store first and second data signals one at a time, said read out gate circuit including in combination, power supply means for providing a current coupled to a reference potential, resistance means coupled to said power supply means, a first data switching transistor having a base electrode coupled to the memory circuit for receiving the first data signal and being responsive thereto to become conductive, said first data switching transistor further having an emitter electrode coupled to the reference potential and a collector electrode, a second data switching transistor having a base electrode coupled to the memory circuit for receiving the second data signal and being responsive thereto to become conductive, said second data switching transistor further having an emitter electrode coupled to said reference potential and a collector electrode coupled to said resistance means, a normally conductive current switching transistor having an emitter electrode coupled to said collector electrode of said first data switching transistor and a collector electrode coupled to said resistance means, said first data switching transistor and said current switching transistor forming a first current path and said second data switching transistor forming a second current path, a given one of said first and second data switching transistors being responsive to the particular one of the first and second data signals stored in the memory circuit to become conductive whereby a current flows through the current path including said given data switching transistor and through said resistance means, a bypass switching transistor having an emitter electrode coupled to said emitter electrode of said current switching transistor, a collector electrode coupled to said power supply means and a base electrode adapted to receive a read signal, said bypass switching transistor being responsive to said read signal to become conductive and to render said current switching transistor coupled thereto non-conductive whereby a third current path bypassing said resistance means is provided, output means coupled to said resistance means and responsive to the magnitude of said flow of current through said resistance means to develop first and second output signals.

No references cited.

ARTHUR GAUSS, *Primary Examiner.*

R. H. PLOTKIN, *Assistant Examiner.*

U.S. Cl. X.R.

307—242, 254, 289